United States Patent [19]
Ito et al.

[11] Patent Number: 5,683,092
[45] Date of Patent: Nov. 4, 1997

[54] CYLINDER HEAD GASKET WITH AREAS OF RELATIVELY HIGH RIGIDITY

[75] Inventors: Eiji Ito, Nagoya; Masashi Takeda, Toyota; Tetsushi Suzuki, Aichi-ken; Yasushi Hamada, Toyota, all of Japan

[73] Assignee: Toyota Jidosha Kabushiki Kaisha, Toyota, Japan

[21] Appl. No.: 557,811

[22] Filed: Nov. 14, 1995

[30] Foreign Application Priority Data

Nov. 15, 1994 [JP] Japan .................. 6-280380

[51] Int. Cl.⁶ ............................... F16J 15/08
[52] U.S. Cl. ..................... 277/235 B; 123/90.37
[58] Field of Search ................. 277/180, 235 B, 277/235 A; 123/90.27, 90.37

[56] References Cited

U.S. PATENT DOCUMENTS

| | | | |
|---|---|---|---|
| 1,864,854 | 6/1932 | Oven | 277/235 B |
| 2,024,369 | 12/1935 | Kaiser | 277/235 B |
| 4,214,444 | 7/1980 | Fujioaka et al. | 277/235 B |
| 4,465,287 | 8/1984 | Bindel et al. | 277/235 B |
| 4,705,278 | 11/1987 | Locacius et al. | 277/235 B |
| 4,754,982 | 7/1988 | Udagawa et al. | 277/235 B |
| 5,310,197 | 5/1994 | Bruch et al. | 277/235 B |
| 5,443,887 | 8/1995 | Nakao | 277/235 B |
| 5,551,709 | 9/1996 | Plunkett | 277/235 B |
| 5,586,769 | 12/1996 | Novil et al. | 277/235 B |
| 5,588,657 | 12/1996 | Fujisawa et al. | 277/235 B |

FOREIGN PATENT DOCUMENTS

| | | | |
|---|---|---|---|
| 54-648 | 4/1980 | Japan | 277/235 B |
| 60-012655 | 1/1985 | Japan . | |
| 61-159643 | 10/1986 | Japan . | |
| 61-167452 | 10/1986 | Japan . | |
| 62-96763 | 5/1987 | Japan | 277/235 B |
| 62-116150 | 7/1987 | Japan . | |
| 2-069174 | 5/1990 | Japan . | |
| 2-034451 | 9/1990 | Japan . | |
| 3-108966 | 11/1991 | Japan . | |
| 58423 | 3/1994 | Japan | 277/235 B |
| 129541 | 5/1994 | Japan | 277/235 B |
| 2073335 | 10/1981 | United Kingdom | 277/235 B |

*Primary Examiner*—Scott Cummings
*Attorney, Agent, or Firm*—Cushman, Darby & Cushman IP Group of Pillsbury Madison & Sutro LLP

[57] ABSTRACT

A cylinder head gasket is disposed between a cylinder head and a cylinder block having different coefficients of thermal expansion. The cylinder head gasket has a bore grommet including a cylinder block side portion which is enlarged in a direction away from the cylinder bore hole on an exhaust side and on an end opposite to a chain or gear casing end.

24 Claims, 3 Drawing Sheets

CYLINDER HEAD GASKET WITH AREAS OF RELATIVELY HIGH RIGIDITY

BACKGROUND OF THE INVENTION

1. Field of the Invention

The present invention relates to a cylinder head gasket for an internal combustion engine disposed between a cylinder head and a cylinder block, each having different coefficients of thermal expansion from each other.

2. Description of Related Art

Japanese Utility Model Publication No. HEI 2-69174 discloses a cylinder head gasket disposed between a cylinder head and a cylinder block. In this cylinder head gasket, a surface of a head bolt hole and opposing surfaces of a portion of the gasket surrounding the head bolt hole are covered with a thin metal plate. The metal plate is extended to a bore grommet to be formed integrally with the bore grommet. Therefore, the metal plate actually enlarges upper and lower portions (ears) of the bore grommet up to the head bolt hole positions, so that the cylinder head gasket is locally strengthened by the enlarged ears of the bore grommet.

However, if the above-described conventional cylinder head gasket is used as a gasket disposed between a cylinder head and a cylinder block having a smaller coefficient of thermal expansion than the cylinder head (for example, an aluminum alloy cylinder head and a cast iron cylinder block), then a problem may arise. During operation of the internal combustion engine, the cylinder block facing ear of the grommet will expand by the same amount as the cylinder block restricted by the cylinder block. However, the cylinder head facing ear of the grommet will expand by the same amount as the cylinder head restricted by the cylinder head, causing an expansion difference between the cylinder block facing ear and the cylinder head facing ear of the grommet. As a result, a shear deformation is generated between opposite surfaces of the cylinder head gasket, accompanied by excessively large strains generated in a core plate of the cylinder head gasket and graphite plate laminated layers provided on opposite sides of the core plate. In an extreme case, this is accompanied by cracking at roots of erected portions formed by punching in the core plate, destruction of the graphite plate laminated layers, and leakage of gas and water.

SUMMARY OF THE INVENTION

An object of the present invention is to provide a cylinder head gasket which has improved strength and which will not be destroyed, even if the cylinder head gasket is used between a cylinder head and a cylinder block having different coefficients of thermal expansion, respectively.

To achieve the above object, a cylinder head gasket in accordance with the present invention has increased rigidity on an exhaust side and/or a side opposite to a chain or gear casing side of the cylinder head gasket. This is accompanied by enlarging only a cylinder block facing portion (ear) of a bore grommet of the cylinder head gasket in a direction away from a cylinder bore hole of the cylinder head gasket.

BRIEF DESCRIPTION OF THE DRAWINGS

The above and other objects, features, and advantages of the present invention will become more apparent and will be more readily appreciated from the following detailed description of the preferred embodiment of the present invention in conjunction with the accompanying drawings, in which.

2

DETAILED DESCRIPTION OF THE PREFERRED EMBODIMENT

First, general structures of a cylinder head gasket in accordance with one embodiment of the present invention will be explained with reference to FIGS. 1 and 3.

The cylinder head gasket 10 is disposed between a cylinder block 12 (see FIG. 3) and a cylinder head 14 (see FIG. 3) of an internal combustion engine (not seen here). The cylinder block 12 has, for example, a smaller coefficient of thermal expansion than the cylinder head 14. More particularly, the cylinder block 12 may be made from cast iron and the cylinder head 14 may be made from an aluminum alloy. The cylinder head 14 is fastened to the cylinder block 12 by a plurality of head bolts, so that the cylinder head gasket 10 is squeezed between the cylinder block 12 and the cylinder head 14 (see, for example, FIG. 3).

The cylinder head gasket 10 includes at least one (in most cases, a plurality of) cylinder bore hole 16. Hereinafter, a case where a plurality of cylinder bore holes 16 are formed in the gasket 10 will be explained. The cylinder head gasket 10 includes a chain or gear casing end (a driving element end) 24 at one end of a row of the plurality of cylinder bore holes 16, where a chain or gear passing hole 18 is formed in the cylinder head gasket 10. The cylinder head gasket 10 includes an exhaust side 20 on one side of the row of cylinder bore holes 16, in a direction perpendicular to the direction of the row of cylinder bore holes 16, and an intake side 22 on the other side of the row of cylinder bore holes 16, in the direction perpendicular to the row of cylinder bore holes 16.

In the internal combustion engine, air is suctioned from the intake side, and a mixture of fuel and the air is burned in a combustion chamber formed in the cylinder bore. High temperature exhaust gas is exhausted through the exhaust side. Therefore, in the cylinder block 12 and the cylinder head 14, a temperature on the exhaust side is generally higher than that on the intake side.

Engine cooling water enters a water jacket formed in the cylinder block 12 from the chain or gear casing side (which corresponds to a front side of the cylinder block 12), then flows from the front side of the cylinder block 12 to a rear side of the cylinder head 14, and from the rear side of the cylinder head 14 to the front side of the cylinder head 14. Therefore, the temperature of the cylinder head 14 is generally higher than that of the cylinder block 12.

In the cylinder head gasket 10, a plurality of head bolt holes 28 for receiving a respective cylinder head bolt, a plurality of water holes 30 for letting engine cooling water pass therethrough, at least one oil hole 32 for letting lubricant oil pass therethrough, and at least one oil return hole 34 for letting return oil pass therethrough are formed.

Figure 1:
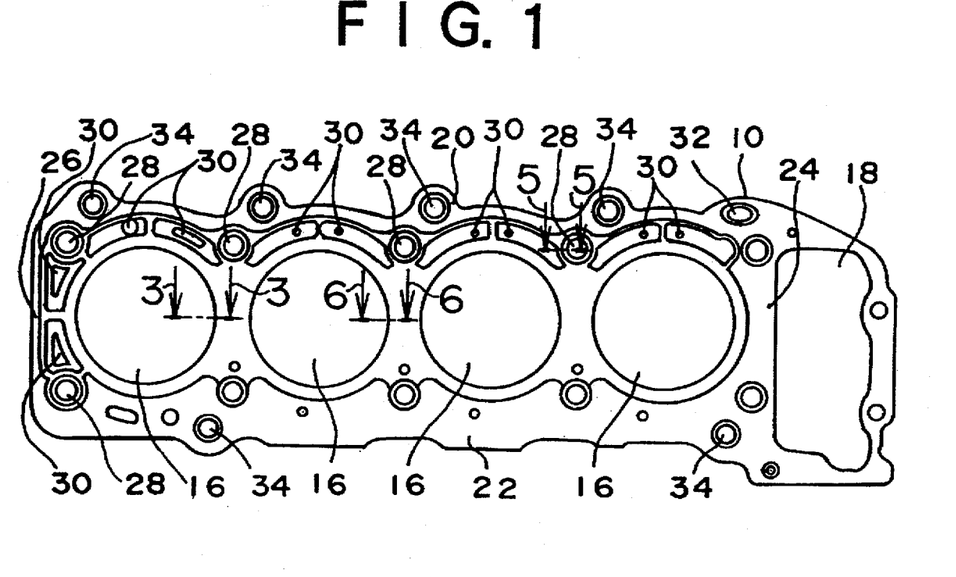
FIG. 1 is a plan view of a cylinder head gasket in accordance with one embodiment of the present invention, as viewed from a cylinder block side.
Figure 3:
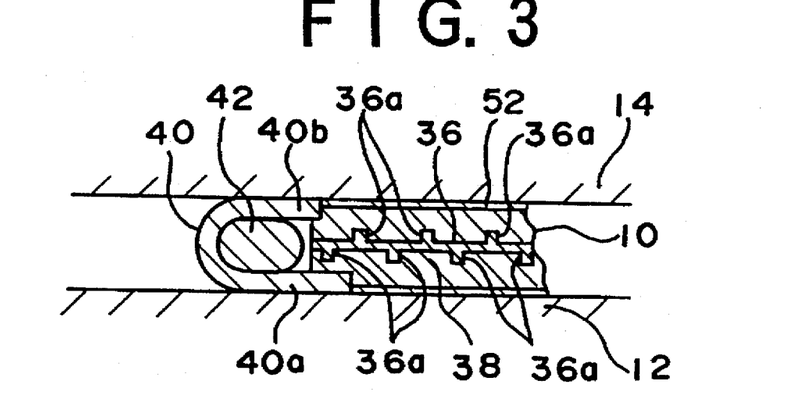
FIG. 3 is a cross-sectional view of the cylinder head gasket of FIG. 1 along line 3—3.
Figure 5:
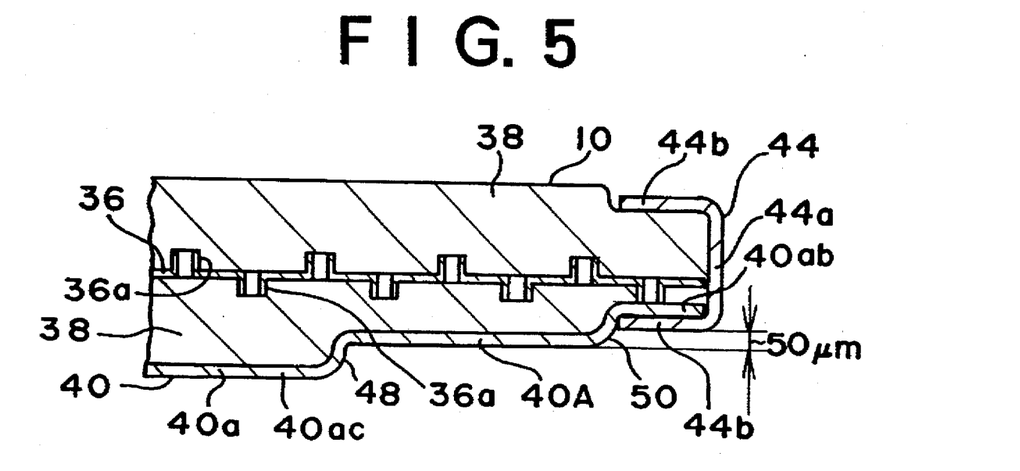
FIG. 5 is an enlarged partial cross-sectional view of a portion of the cylinder head gasket of FIG. 1 in the vicinity of a head bolt hole.

As illustrated in FIGS. 1 and 3, the cylinder head gasket 10 includes a steel core plate 36, graphite plate laminated layers 38 provided on opposite sides of the core plate 36 in a thickness direction of the core plate 36, a bore grommet 40, and a wire ring 42 disposed within the bore grommet 40. The core plate 36 is made from steel (for example, selected from the group composed of Japanese Industrial standard, SECC, SCP, and SVS) and has a coefficient of thermal expansion substantially equal to a coefficient of thermal expansion of cast iron. Each graphite plate of the laminated layers 38 is made of material including graphite as a main component thereof. The bore grommet 40 is made from metal, more particularly, stainless steel. The wire ring 42 is made from iron or low alloy steel. As shown in FIG. 5, the cylinder head gasket 10 further includes an eyelet 44 provided around the head bolt hole 28. The eyelet 44 includes a portion 44a extending axially along an inside surface of the head bolt hole 28 and portions 44b extending along opposite surfaces of the gasket at opposite ends of the portion 44a. It is not necessary to provide eyelets for the oil hole 32 or the oil return hole 34.

Structures and operation thereof unique to the present invention will now be explained.

Figure 2:
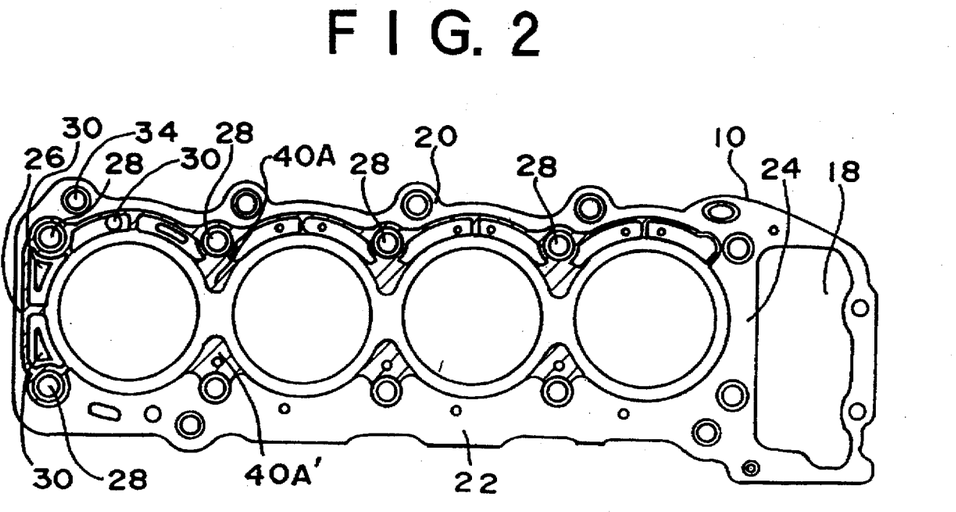
FIG. 2 is a plan view of the cylinder head gasket of FIG. 1 wherein an enlarged portion of a bore grommet is shown by hatching.

As illustrated in FIGS. 1 and 2, the exhaust side 20 of the cylinder head gasket 10 is selectively made more rigid than the intake side 22 of the cylinder head gasket 10 by enlarging the bore grommet 40 in a direction away from the cylinder bore hole 16, mainly toward the exhaust side. Hatched portion 40A in FIG. 2 shows the enlarged portion of the grommet. An intake side portion 40A' of the hatched portion 40A is not necessarily provided.

Further, as illustrated in FIGS. 1 and 2, the rear end (an end 26 opposite to the chain or gear casing side 24) of the cylinder head gasket 10 is selectively made more rigid than the chain or gear casing end 24 of the cylinder head gasket 10 by enlarging the bore grommet 40 in a direction away from the cylinder bore hole 16, mainly toward the rear end of the cylinder head gasket 10. Hatched portion 40A corresponds to the enlarged portion of the grommet.

As illustrated in FIG. 3, the enlarged portion 40A of the bore grommet 40 for increasing rigidity is formed in a cylinder block facing surface of the cylinder head gasket 10, i.e., a surface contacting the cylinder block 12. More particularly, the bore grommet 40 has opposite portions or ears 40a and 40b (one 40a extending along an upper surface of the cylinder block 12 and the other 40b extending along a lower surface of the cylinder head 14). The above-mentioned higher rigidity is formed in the bore grommet 40 by enlarging the only cylinder block facing portion, i.e., ear 40a, in a direction away from the cylinder bore hole 16. The enlarged portion 40A is made of stainless steel. The cylinder head facing portion, i.e., ear 40b, is not enlarged.

A greater thermal expansion difference between the cylinder block 12 and the cylinder head 14 arises more on the exhaust side than on the intake side of the engine. Because the cylinder block 12 and the cylinder head 14 are most strongly fixed to each other at the chain or gear casing, a relative expansion difference between the cylinder block 12 and the cylinder head 14 is small on the chain or gear casing end 24. Therefore, the thermal expansion difference is more likely to cause the cylinder block 12 and cylinder head 14 to move relative to each other at end 26 opposite to the chain or gear casing end 24. As a result, a great shear force is likely to act on the exhaust side 20 and the end 26 opposite to the chain or gear casing of the cylinder head gasket 10. However, because exhaust side 20 and end 26 of the cylinder head gasket 10 are selectively made more rigid and strong, according to the present invention, by enlarging the cylinder block facing portion 40a of the bore grommet 40, the cylinder head gasket 10, including the core plate 36 and the graphite plate laminated layers 38, is protected from destruction.

In this instance, since the core plate 36 is made from steel, an amount of thermal expansion of the core plate 36 is substantially equal to that of the cylinder block 12, which is made from cast iron. Although the enlarged portion 40A of the bore grommet 40 is made from stainless steel, the thermal expansion of enlarged portion 40A is restricted by the cylinder block 12, so that the amount of the thermal expansion of the enlarged portion 40A is substantially equal to that of the cylinder block 12. Although the aluminum alloy cylinder head 14 thermally expands more than the core plate 36, the cylinder head 14 causes slippage at a contact surface with the graphite plate laminated layer 38. As a result, thermal stresses are dissipated in the core plate 36, so that cracking in the core plate 36 is prevented. Further, because the thermal expansion of the enlarged portion 40A of the bore grommet 40 is restricted to about the same amount as the cylinder block 12, a large shear force does not act on the portion of the graphite plate laminated layer 38 disposed between the enlarged portion 40A of the bore grommet 40 and the core plate 36, so that the layer 38 will not be destroyed.

As illustrated in FIG. 3, the core plate 36 has a plurality of erected portions (nails) 36a, each protruding in a thickness direction of the core plate 36. The erected portions 36a generally protrude alternately in opposite directions, as seen in this cross-sectional view. The erected portion 36a can be formed by the punching a plate and erecting the punched tag. Since the erected portion 36a engage the graphite plate laminated layers 38, the core plate 36 and the graphite plate laminated layers 38 move integrally with each other when they thermally expand.

Figure 4:
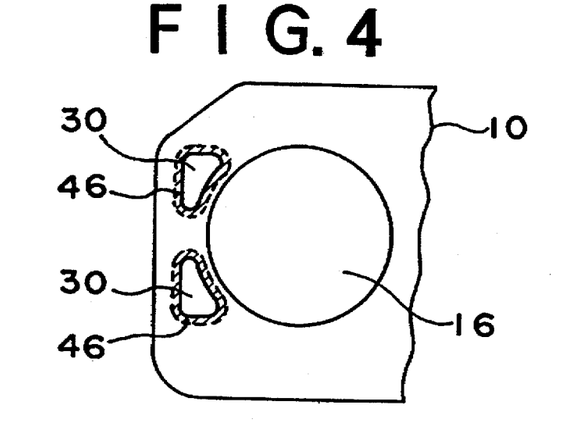
FIG. 4 is a partial plan view of the cylinder head gasket of FIG. 1 wherein an area where no erected portion is provided to a core plate of the cylinder head gasket is shown by hatching.

However, as illustrated in FIG. 4, formation of the erected portions 36a is omitted in the vicinity of the water holes 30 on the portions of the cylinder head gasket 10 having a higher rigidity, (i.e., on the end 26 opposite to the chain or gear casing side and on the exhaust side 20). Hatched portion 46 in FIG. 4 shows where formation of the erected portions is omitted.

When a crack starts in the core plate 36, it starts at a hole which is formed when forming the erected portion. However, because formation of such a hole is omitted at a portion where a significant shear force is expected to act, cracking is effectively prevented, even if a great shear force acts on the core plate 36.

As illustrated in FIG. 3, a heat resistant lubricant coating layer 52 is formed on a cylinder head facing surface of the cylinder head gasket, more particularly, on a cylinder head facing surface of the graphite plate laminated layer 38 of the cylinder head gasket 10. The lubricant material is, for example, a synthetic resin having a low coefficient of friction (for example, silicone resin), graphite, or carbon. A thickness of the coating layer is in the range of about 20 to 30 microns.

Due to the lubricant coating layer 52, when a difference in thermal expansion arises between the cylinder head gasket 10 and the lower surface of the cylinder head 14, the cylinder head gasket 10 and the cylinder head 14 can slip relative to each other. As a result, a shear force does not act on the cylinder head gasket 10, and destruction of the cylinder head gasket 10 is prevented.

As illustrated in FIG. 5, the cylinder block facing portion (ear) 40a of the bore grommet 40 has a cylinder bore surrounding portion 40ac, the enlarged portion 40A, and a bolt hole surrounding portion 40ab which is covered with the portion 44b of the eyelet 44. The cylinder block facing portion 40a of the bore grommet 40 has a first step portion 48 between the cylinder bore surrounding portion 40ac and the enlarged portion 40A and a second step portion 50 between the enlarged portion 40A and the bolt hole surrounding portion 40ab before the cylinder head gasket 10 is squeezed between the cylinder head 14 and the cylinder block 12 so that the enlarged portion 40A recedes from an extension of the cylinder bore surrounding portion 40ac and the bolt hole surrounding portion 40ab recedes from an extension of the enlarged portion 40A. Those steps 48 and 50 have a height of about 50 microns.

Since the head bolts fasten cylinder head 14 to the cylinder block 12, the cylinder head gasket 10 receives a greatest compressive force in the vicinity of a bolt hole 28. Since a gasket surface pressure decreases gradually in a direction away from the bolt hole 28, the surface pressure at the bore grommet 40 is relatively not large. With the enlarged portion 40A of the bore grommet 40, since it is made from metal, it cannot easily follow the upper surface of the cylinder block 12 with a uniform pressure. Further, if the portion 44b of the eyelet 44 rides on the enlarged portion 40A of the bore grommet, a gap will be caused between the enlarged portion 40A of the bore grommet and the upper surface of the cylinder block 12 to cause a gas and water leakage. However, in the present invention, since those step portions 48 and 50 are provided in the cylinder head gasket 10, the gasket surface pressure when the gasket is squeezed is optimized, whereby the seal characteristic is improved and gaps do not occur in the vicinity of the eyelet 44.

Figure 6:
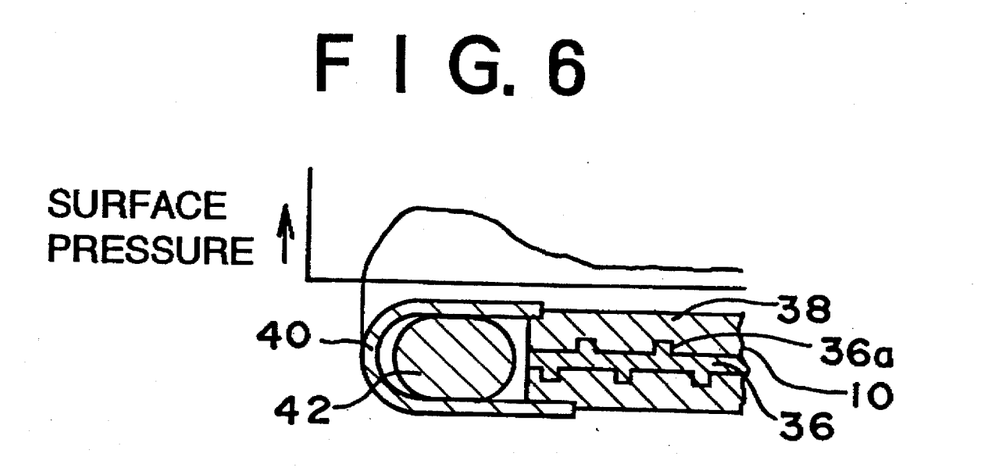
FIG. 6 is an enlarged partial cross-sectional view of a portion of the cylinder head gasket of FIG. 1 in the vicinity of a bore grommet and a wire ring of the cylinder head gasket, and a graph illustrating a surface pressure distribution along the cylinder head gasket.

Preferably, as illustrated in FIG. 6, a contour of a cross section of the wire ring 42 disposed within the bore grommet 40 has a shape having straight sides, for example, a shape defined by parallel straight sides and semicircles connecting the straight sides. For reference, FIG. 7 shows a cross section of the conventional gasket wherein the bore grommet 102 does not have an enlarged portion and the cross section of the wire ring 100 is circular.

Figure 7:
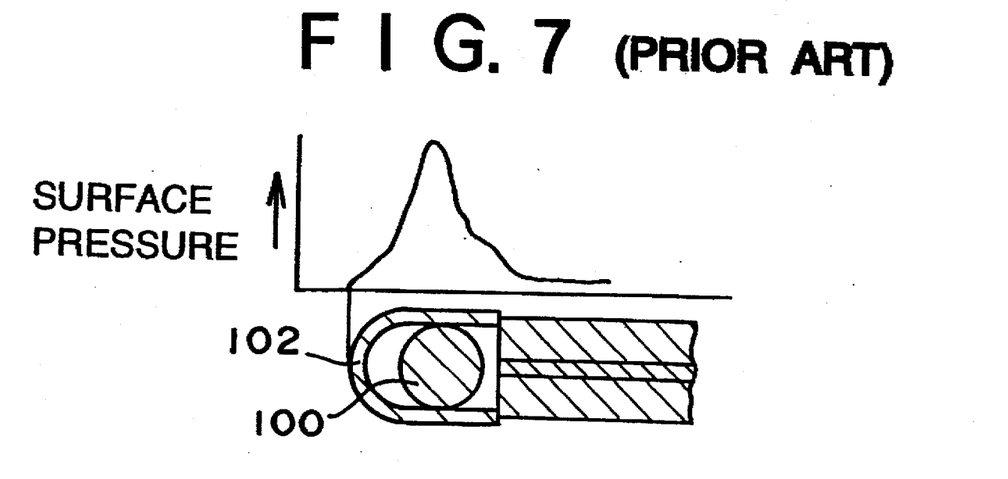
FIG. 7 is a cross-sectional view of a portion of a conventional cylinder head gasket in the vicinity of a bore grommet and a wire ring of the cylinder head gasket, and a graph illustrating a surface pressure distribution along the cylinder head gasket.

In the case where the cross section of the wire ring is circular as shown in FIG. 7, an area of the contact surface between the bore grommet 102 and the wire ring 100 is very small. As a result, as illustrated in FIG. 7, surface pressures between the bore grommet and the cylinder block and between the bore grommet and the cylinder head concentrate at the contact point therebetween. Therefore, when the wire ring 100 causes a permanent deformation during use, the surface pressure will greatly decrease, degrading the seal characteristic. In contrast, in the present invention, since the wire ring 42 contacts the bore grommet 40 at flat portions as shown in FIG. 6, the surface pressure is distributed over the flat portion, so that the wire ring 42 is unlikely to cause a permanent deformation and a good seal characteristic can be maintained for a long time period.

According to the present invention, the following advantages are obtained:

First, since the exhaust side 20 of the cylinder head gasket is selectively made more rigid than the intake side 22, destruction of the cylinder head gasket 10 can be effectively prevented.

Second, since the end 26 opposite to the chain or gear casing end 24 of the cylinder head gasket 10 is selectively made more rigid than the chain or gear casing end 24, destruction of the cylinder head gasket 10 can be effectively prevented.

Third, in a case where the higher rigidity is embodied in the cylinder block side surface of the cylinder head gasket 10, an amount of thermal expansion of the cylinder block facing surface is restricted to be substantially the same as that of the cylinder block 12, so that excessively large thermal stresses will not be caused in the core plate 36, which has a coefficient of thermal expansion substantially equal to that of the cylinder block 12. As a result, destruction of the core plate 36 is effectively prevented.

Fourth, in a case where the higher rigidity is embodied in the bore grommet 40 by enlarging the cylinder block facing portion 40a of the bore grommet 40, the graphite plate laminated layer 38 between the core plate 36 and the cylinder block side portion 40a of the bore grommet 40 is protected from destruction.

Fifth, in a case where step portions 48 and 50 are provided in the cylinder block facing portion 40a of the bore grommet 40, the gasket surface pressure becomes substantially uniform and the seal characteristic is improved.

Sixth, in a case where erected portions 36a are formed in the core plate 36, the core plate 36 and the graphite plate laminated layer 38 are made effectively integral with each other in movement. Since the core plate 38 and the expanded portion 40A of the grommet 40 thermally expand by about the same amount, no great relative thermal expansion difference will be generated between the graphite plate laminated layer 38 and the expanded portion 40A of the grommet 40 so that destruction of the cylinder head gasket 10 is effectively prevented.

Seventh, in a case where formation of the erected portion 36a is omitted in the vicinity of the water holes 30 on the exhaust side and the end opposite to the chain or gear casing side, cracking in the core plate 36 is effectively prevented.

Eighth, in a case where a lubricant coating layer 52 is formed on the cylinder head facing surface of the cylinder head gasket 10, the cylinder head 14 and the cylinder head gasket 10 can slip relative to each other when any thermal expansion difference occurs between the cylinder head 14 and the cylinder head gasket 10, so that destruction of the cylinder head gasket 10 is effectively prevented.

Ninth, in a case where the wire ring 42 has a cross section having straight sides at which the wire ring 42 contacts the bore grommet 40, surface pressure concentration and local permanent deformation of the wire ring 42 are prevented, so that a good seal characteristic can be obtained for a long period of time.

Although only one embodiment of the present invention has been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A cylinder head gasket disposed between a cylinder head and a cylinder block having different respective coefficients of thermal expansion, said cylinder head gasket comprising:
  a cylinder block facing surface;
  a cylinder head facing surface;
  an intake side;
  an exhaust side having a higher rigidity than said intake side, said higher rigidity being provided on said cylinder block facing surface; and
  a bore grommet defining at least one cylinder bore hole therein and having a cylinder head facing portion and a cylinder block facing portion, wherein said higher rigidity is provided by enlarging only said cylinder block facing portion of said bore grommet in a direction away from said at least one cylinder bore hole.

2. A cylinder head gasket adapted for use between a cylinder head and a cylinder block having different coefficients of thermal expansion and having a driving element casing end and an end opposite said driving element casing end, said cylinder head gasket comprising:
  a gasket body having a substantially constant rigidity extending across an entirety of said gasket, said gasket consisting exclusively of said gasket body at said driving element casing end;
  a cylinder head facing surface;
  a cylinder block facing surface;
  rigidity-enhancing structure attached to and provided on said cylinder block facing surface at said opposite end of said gasket to positively increase the rigidity of said opposite end relative to said driving element casing end; and
  a bore grommet defining at least one cylinder bore hole therein and having a cylinder head facing portion and a cylinder block facing portion, wherein said rigidity-enhancing structure is provided by enlarging only said cylinder block facing portion of said bore grommet in a direction away from said at least one cylinder bore hole.

3. A cylinder head gasket disposed between a cylinder head and a cylinder block having different respective coefficients of thermal expansion, said cylinder head gasket comprising:
  a cylinder block facing surface;
  a cylinder head facing surface;
  an intake side;
  an exhaust side having a higher rigidity than said intake side, said higher rigidity being provided on said cylinder block facing surface;
  a bore grommet defining at least one cylinder bore hole therein and having a cylinder head facing portion and a cylinder block facing portion, wherein said higher rigidity is provided by enlarging said cylinder block facing portion of said bore grommet in a direction away from said at least one cylinder bore hole, wherein said cylinder block facing portion of said bore grommet includes a cylinder bore surrounding portion, an enlarged portion enlarged in the direction away from said at least one cylinder bore hole, and a bolt hole surrounding portion, said cylinder block facing portion of said bore grommet having a first step portion between said cylinder bore surrounding portion and said enlarged portion and a second step portion between said enlarged portion and said bolt hole surrounding portion.

4. A cylinder head gasket adapted for use between a cylinder head and a cylinder block having different coefficients of thermal expansion and having a driving element casing end and an end opposite said driving element casing end, said cylinder head gasket comprising:
  a gasket body having a substantially constant rigidity extending across an entirety of said gasket, said gasket consisting exclusively of said gasket body at said driving element casing end;
  a cylinder head facing surface;
  a cylinder block facing surface;
  rigidity-enhancing structure attached to and provided on said cylinder block facing surface at said opposite end of said gasket to positively increase the rigidity of said opposite end relative to said driving element casing end; and
  a bore grommet defining at least one cylinder bore hole therein and having a cylinder head facing portion and a cylinder block facing portion, wherein said rigidity-enhancing structure is provided by enlarging said cylinder block facing portion of said bore grommet in a direction away from said at least one cylinder bore hole, wherein said cylinder block facing portion of said bore grommet includes a cylinder bore surrounding portion, an enlarged portion enlarged in the direction away from said at least one cylinder bore hole, and a bolt hole surrounding portion, said cylinder block facing portion of said bore grommet having a first step portion between said cylinder bore surrounding portion and said enlarged portion and a second step portion between said enlarged portion and said bolt hole surrounding portion.

5. A cylinder head gasket according to claim 1, further comprising a core plate having a plurality of erected portions formed therein.

6. A cylinder head gasket according to claim 2, further comprising a core plate having a plurality of erected portions formed therein.

7. A cylinder head gasket according to claim 5, further including a plurality of water holes for letting engine cooling water pass therethrough, wherein said plurality of erected portions are omitted in a region adjacent to water holes on a side of the cylinder head gasket having said higher rigidity.

8. A cylinder head gasket according to claim 6, further including a plurality of water holes for letting engine cooling water pass therethrough, wherein said plurality of erected portions are omitted in a region adjacent to water holes adjacent said rigidity enhancing structure.

9. A cylinder head gasket according to claim 1, further comprising a lubricant coating layer formed on said cylinder head facing surface.

10. A cylinder head gasket according to claim 2, further comprising a lubricant coating layer formed on said cylinder head facing surface.

11. A cylinder head gasket according to claim 1, wherein said bore grommet includes a wire ring disposed within said bore grommet, said wire ring having a cross section with straight sides at which said wire ring contacts said bore grommet.

12. A cylinder head gasket according to claim 2, wherein said bore grommet includes a wire ring disposed within said bore grommet, said wire ring having a cross section with straight sides at which said wire ring contacts said bore grommet.

13. An internal combustion engine comprising:
a cylinder block;
a cylinder head attached to said cylinder block, said cylinder head having a different coefficient of thermal expansion than said cylinder block; and
a cylinder head gasket disposed between said cylinder head and said cylinder block, said cylinder head gasket comprising:
a cylinder head facing surface;
a cylinder block facing surface;
an intake side;
an exhaust side having a higher rigidity than said intake side, said higher rigidity being provided on said cylinder block facing surface; and
a bore grommet defining at least one cylinder bore hole therein and having a cylinder head facing portion and a cylinder block facing portion, wherein said higher rigidity is provided by enlarging only said cylinder block facing portion of said bore grommet in a direction away from said at least one cylinder bore hole.

14. An internal combustion engine comprising:
a cylinder block;
a cylinder head attached to said cylinder block, said cylinder head having a different coefficient of thermal expansion than said cylinder block; and
a cylinder head gasket disposed between said cylinder head and said cylinder block and having a driving element casing end and an end opposite said driving element casing end, said cylinder head gasket comprising:
a gasket body having a substantially constant rigidity extending across an entirety of said gasket, said gasket consisting exclusively of said gasket body at said driving element casing end;
a cylinder head facing surface;
a cylinder block facing surface;
rigidity-enhancing structure provided on said cylinder block facing surface and attached to and provided at said opposite end of said gasket to positively increase the rigidity of said opposite end relative to said driving element casing end; and
a bore grommet defining at least one cylinder bore hole therein and having a cylinder head facing portion and a cylinder block facing portion, wherein said rigidity-enhancing structure is provided by enlarging only said cylinder block facing portion of said bore grommet in a direction away from said at least one cylinder bore hole.

15. An internal combustion engine comprising:
a cylinder block;
a cylinder head attached to said cylinder block, said cylinder head having a different coefficient of thermal expansion than said cylinder block; and
a cylinder head gasket disposed between said cylinder head and said cylinder block, said cylinder head gasket comprising:
a cylinder head facing surface;
a cylinder block facing surface;
an intake side;
an exhaust side having a higher rigidity than said intake side, said higher rigidity being provided on said cylinder block facing surface; and
a bore grommet defining at least one cylinder bore hole therein and having a cylinder head facing portion and a cylinder block facing portion, wherein said higher rigidity is provided by enlarging said cylinder block facing portion of said bore grommet in a direction away from said at least one cylinder bore hole, wherein said bore grommet of said cylinder head gasket includes a cylinder bore surrounding portion, an enlarged portion enlarged in the direction away from said at least one cylinder bore hole, and a bolt hole surrounding portion, said cylinder block facing portion of said bore grommet having a first step portion between said cylinder bore surrounding portion and said enlarged portion and a second step portion between said enlarged portion and said bolt hole surrounding portion.

16. An internal combustion engine comprising:
a cylinder block;
a cylinder head attached to said cylinder block, said cylinder head having a different coefficient of thermal expansion than said cylinder block; and
a cylinder head gasket disposed between said cylinder head and said cylinder block and having a driving element casing end and an end opposite said driving element casing end, said cylinder head gasket comprising:
a gasket body having a substantially constant rigidity extending across an entirety of said gasket, said gasket consisting exclusively of said gasket body at said driving element casing end;
a cylinder head facing surface;
a cylinder block facing surface;
rigidity-enhancing structure provided on said cylinder block facing surface and attached to and provided at said opposite end of said gasket to positively increase the rigidity of said opposite end relative to said driving element casing end; and
a bore grommet defining at least one cylinder bore hole therein and having a cylinder head facing portion and a cylinder block facing portion, wherein said rigidity-enhancing structure is provided by enlarging said cylinder block facing portion of said bore grommet in a direction away from said at least one cylinder bore hole, wherein said bore grommet of said cylinder head gasket includes a cylinder bore surrounding portion, an enlarged portion enlarged in the direction away from said at least one cylinder bore hole, and a bolt hole surrounding portion, said cylinder block facing portion of said bore grommet having a first step portion between said cylinder bore surrounding portion and said enlarged portion and a second step portion between said enlarged portion and said bolt hole surrounding portion.

17. The internal combustion engine of claim 13, wherein said cylinder head gasket further comprises a core plate having a plurality of erected portions formed therein.

18. The internal combustion engine of claim 14, wherein said cylinder head gasket further comprises a core plate having a plurality of erected portions formed therein.

19. The internal combustion engine of claim 17, wherein said cylinder head gasket further includes a plurality of water holes for letting engine cooling water pass therethrough, wherein said plurality erected portions are omitted in a region adjacent to water holes on a side of the cylinder head gasket having said higher rigidity.

20. The internal combustion engine of claim 18, wherein said cylinder head gasket further includes a plurality of water holes for letting engine cooling water pass therethrough, wherein said plurality of erected portions are omitted in a region adjacent to water holes adjacent said rigidity-enhancing structure.

21. The internal combustion engine of claim 13, wherein said cylinder head gasket further comprises a lubricant coating layer formed on said cylinder head facing surface.

22. The internal combustion engine of claim 14, wherein said cylinder head gasket further comprises a lubricant coating layer formed on said cylinder head facing surface.

23. The internal combustion engine of claim 13, wherein said bore grommet includes a wire ring disposed within said bore grommet, said wire ring having a cross section with straight sides at which said wire ring contacts said bore grommet.

24. The internal combustion engine of claim 14, wherein said a bore grommet includes a wire ring disposed within said bore grommet, said wire ring having a cross section with straight sides at which said wire ring contacts said bore grommet.

* * * * *

UNITED STATES PATENT AND TRADEMARK OFFICE
CERTIFICATE OF CORRECTION

PATENT NO. : 5,683,092
DATED : November 4, 1997
INVENTOR(S) : ITO et al.

It is certified that error appears in the above-identified patent and that said Letters Patent is hereby corrected as shown below:

On the title page;

[73] Assignee: Toyota Jidosha Kabushiki Kaisha, Toyota, Japan the face of the patent should read:

[73] Assignee: Toyota Jidosha Kabushiki Kaisha, Toyota-shi, Japan;
Nippon Gasket Co., Ltd., Osaka, Japan Signed and Sealed this Twenty-fourth Day of August, 1999

Attest:

Q. TODD DICKINSON

*Attesting Officer*     *Acting Commissioner of Patents and Trademarks*